United States Patent [19]
Miyamoto et al.

[11] Patent Number: 5,478,647
[45] Date of Patent: Dec. 26, 1995

[54] COMPOSITE PREPREG AND TENNIS RACKETS USING THE SAME

[75] Inventors: Kenichi Miyamoto, Akashi; Haruyoshi Minamiguchi, Nishinomiya, both of Japan

[73] Assignee: Sumitomo Rubber Industries, Ltd., Kobe, Japan

[21] Appl. No.: 338,216

[22] Filed: Nov. 9, 1994

Related U.S. Application Data

[63] Continuation of Ser. No. 618,607, Nov. 27, 1990, abandoned.

[30] Foreign Application Priority Data

Nov. 28, 1989 [JP] Japan .................... 1-308231

[51] Int. Cl.⁶ .................... B32B 27/02
[52] U.S. Cl. .................... 428/373; 428/374; 428/375; 428/392; 428/397; 428/408
[58] Field of Search .................... 428/408, 373, 428/374, 375, 392, 397

[56] References Cited

U.S. PATENT DOCUMENTS 4,532,275  7/1985  Aito et al. ................ 428/267

FOREIGN PATENT DOCUMENTS

| | | |
|---|---|---|
| 58-205755 | 11/1983 | Japan. |
| 62-059030 | 5/1987 | Japan. |
| 1174413 | 8/1989 | Japan. |
| 2218641 | 3/1989 | United Kingdom. |

*Primary Examiner*—Patrick J. Ryan
*Assistant Examiner*—Richard C. Weisberger
*Attorney, Agent, or Firm*—Birch, Stewart, Kolasch & Birch

[57] ABSTRACT

Disclosed is a composite prepreg for producing a tennis racket which is light and tough and superior in flexibility and vibration absorption abilities. The composite prepreg comprises thermosetting resin and reinforcing fibers, wherein the reinforcing fibers are a combination of (a) aromatic polyamide or polyester fibers and (b) carbon fibers and the fibers (a) and (b) are arranged with certain regularity. The present invention also provides a tennis racket comprising a circular frame constituting a ball hitting area and a shaft connecting with the circular frame, the frame and shaft having a plurality of layers structured so that at least one layer is formed from the above mentioned composite prepreg.

2 Claims, 3 Drawing Sheets

COMPOSITE PREPREG AND TENNIS RACKETS USING THE SAME

This application is a continuation of application Ser. No. 07/618,607 filed on Nov. 27, 1990, now abandoned.

FIELD OF THE INVENTION

The present invention relates to a composite prepreg containing two reinforcing fibers and a tennis racket produced from the prepreg.

BACKGROUND OF THE INVENTION

A tennis shaft or frame is generally produced by winding one or more prepregs around a core material and then heating in a mold. The prepregs are composed of thermosetting resin and reinforcing fibers embedded therein. As the reinforcing fibers, carbon fibers and glass fibers have been employed for years. In order to improve strength, flexibility, impact resistance, feeling when hitting balls (i.e. vibration absorption etc.) and weight saving, aromatic amide fibers and aromatic polyester fibers are also proposed together with carbon and glass fibers in Japanese Kokai Publications 69870/1982, 142572/1987 and 141678/1989.

The aromatic amide and polyester fibers, however, are too tough and associated with problems in producibility in the case of being embedded as a sole layer. For example, in a drilling process for creating holes for passing gut through the frame of the racket, to drill such holes due to the toughness of the aromatic amide or polyester fibers embedded in the tennis racket frame. Also, in a buffing process for smoothening the surface, fuzzing often occurs. Furthermore, the inter laminated shear strength would be insufficient because of different physical properties among adjacent laminated layers.

SUMMARY OF THE INVENTION

The present invention provides a composite prepreg for producing a tennis racket which is light and tough and superior in flexibility and vibration absorption abilities. The composite prepreg of the present invention comprises thermosetting resin and reinforcing fibers embedded therein, wherein the reinforcing fibers are a combination of (a) aromatic polyamide or aromatic polyester fibers, or the both and (b) carbon fibers and the fibers (a) and (b) are arranged with certain regularity.

The present invention also provides a tennis racket comprising a circular frame constituting a ball hitting area and a shaft connecting with the circular frame, the frame and shaft having a plural layer structure in which at least one layer is formed from the above-mentioned composite prepreg.

BRIEF EXPLANATION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

The aromatic polyamide fibers employed in the present invention include aramide. Some of the polyamide fibers are commercially available under the trade names Kevler, and Towaron. The aromatic polyester fibers include polyacrylates They are commercially available under the trade names Vectran, and Econol. In the present invention, the use of aromatic polyamide fibers or polyester fibers, or both (a) are combined with the carbon fibers (b), but the weight ratio of (a)/(b) is preferably within the range of 30/70 to 70/30, more preferably 40/60 to 50/50. Weight ratios of more than 70/30 do not impart sufficient toughness and those of less than 30/70 are poor in vibration absorption properties.

The fibers (a) and (b) are collected to form fiber strands which are embedded in the thermosetting resin. The carbon fiber strands preferably have a diameter of 1,800 to 7200 denier, more preferably 3,600 to 7,200 denier. The aromatic amide or polyester fiber strands preferably have a diameter of 1,500 to 7,500 denier, more preferably 4,500 to 7,500 denier. A diameter ratio between the carbon fiber strands (b)/the amide or polyester fiber strands (a) is preferably within the range of 2 to ⅔ in order to enhance the uniformity between the prepregs and to increase the adhesive ability between the layers.

According to the present invention, the strands of fibers (a) and the strands of fibers (b) are arranged with a certain regularity. The terminology "with certain regularity" is not understood strictly and certain regularity is seen to some extent as a whole. For example, the strands of fibers (a) and the strands of fiber (b) (hereinafter referred to as "(a,b) unit") may be alternatively repeated. Also, an (a,a,b) unit may be repeated.

Figure 4:
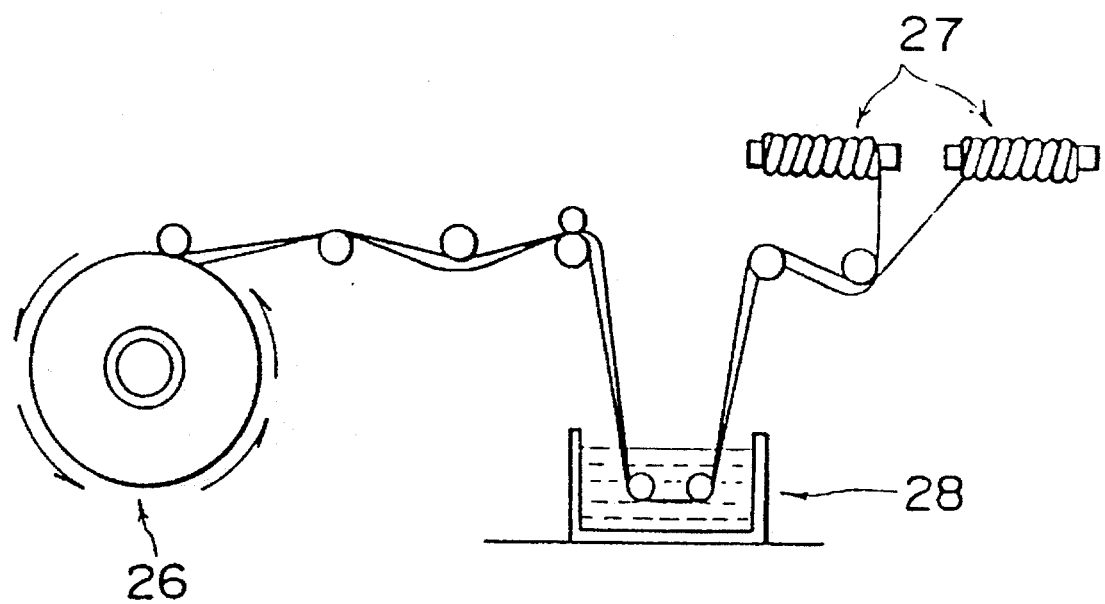
FIG. 4 schematically shows a process for preparing the composite prepreg of the present invention.

The composite prepreg of the present invention can be obtained by conventional methods. For example, as shown in FIG. 4, fiber strands which are wound around two rolls 27 are dipped in a thermosetting resin bath 28 and then wound on a drum 26 with certain regularity. The thermosetting resin may be one well known in the art, but includes epoxy resins.

The composite prepreg of the present invention has suitable toughness for tennis rackets. A conventional prepreg in which only aromatic polyamides or polyester fibers are embedded is too tough to be drilled through, but the prepreg of the present invention is not so tough in comparison thereto. The prepreg of the present invention has physical properties somewhere between the conventional polyamide or-polyester prepreg and a convention carbon prepreg.

The frame or shaft for the tennis rackets of the present invention is generally prepared by winding one or more prepregs around a core and then heating in a mold. All prepregs may be those of the present invention, but preferably some of them are those of the present invention and the other prepregs are the conventional carbon fiber, polyamide fiber, polyester fiber, boron fiber, carbon silicate fiber, or glass fiber prepregs. The number of the prepregs is not limited, but preferably 4 to 8 prepregs in which at least one, preferably 2 to 4 are more preferably the prepregs of the present invention.

The obtained tennis racket is light and tough and suitable in flexibillity and vibration absorption, but still is easy to drill through the frame for stringing the gut.

EXAMPLES

The present invention is illustrated by the following Examples which, however, are not to be construed as limiting the scope of the present invention.

Examples 1 to 4 and Comparative Examples 1 to 6

Preparation of Prepregs

A composite prepreg C+A was prepared using an apparatus of FIG. 4 from thermosetting resin (epoxy resin Dow 331 available from Dow Chemical Co., Ltd.), polyamide fiber strands (Keyler 49, strand diameter =7,500 denier; available from Toray Dupont Co., Ltd) and carbon fiber strands (Besfight HTA strand diameter =7,200 denier, available from Toho Rayon Co., Ltd.). The carbon fiber strands and the polyamide fiber strands are alternatively arranged.

A composite prepreg C+E was prepared as mentioned above, with the exception that polyester fiber strands (Vektran, strand diameter=7,500 denier, available from Kuraray Co., Ltd.) was employed instead of the polyamide fiber strands.

Preparation of tennis rackets

Figure 1:
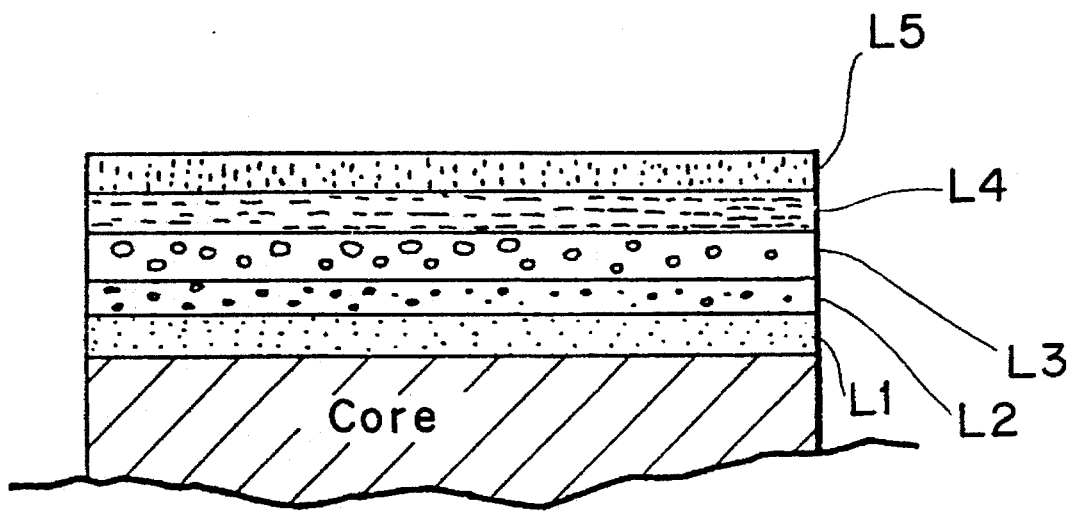
FIG. 1 schematically shows a section of the five prepregs layers.

A core was wound with five prepregs L1, L2, L3, L4 and L5 and heated at 160° C. for 5 minutes in a mold to form a frame and a shaft. FIG. 1 schematically shows a section of the five prepregs layers. The prepregs used are listed in Table 1. A tennis racket was formed from the obtained frame and shaft and subjected to the evaluation of frame strength and vibration absorption. The results of the evaluation are shown in Table 1.

Figure 2:
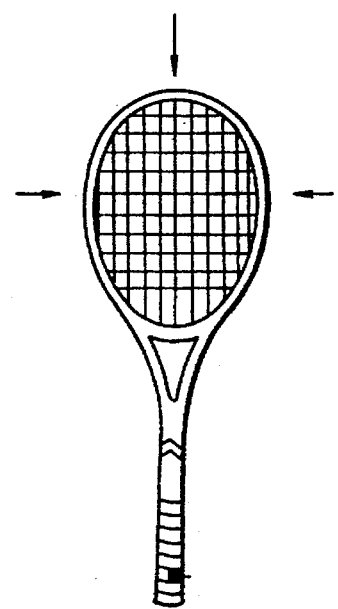
FIG. 2 shows directions for pressing a tennis frame to determine frame strength.

The frame strength was determined by simultaneously pressing the frame of a tennis racket containing a grip 1 from the directions shown in FIG. 2 until the frame was destroyed. Frame strength is expressed as a load (Kg) when the frame was destroyed.

The vibration absorption utilizing vibrator 2 was calculated from the following equation;

$$\text{Vibration absorption (\%)} = \frac{\text{Amplitude on the grip at two seconds after hitting}}{\text{Amplitude on the grip at hitting}} \times 100$$

Figure 3:
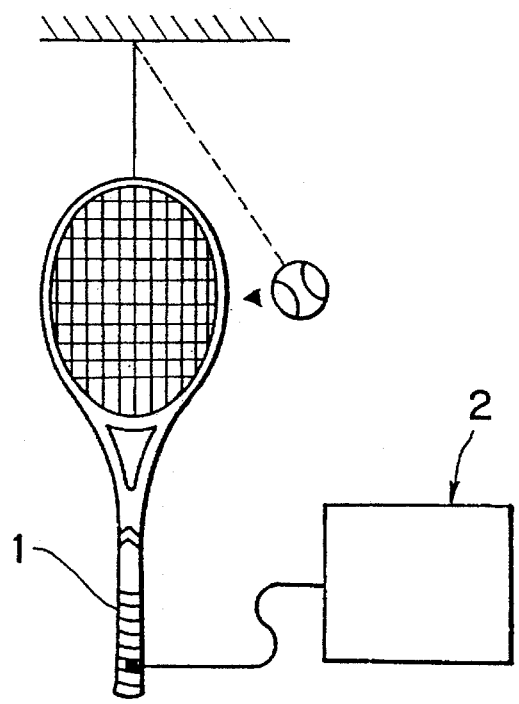
FIG. 3 shows a system for determining vibration absorption.

It was carried out using a system as shown in FIG. 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| First layer | G | G | G | G | G | G | G | G |
| Second layer | C | C | C+A | C+E | A | E | A | E |
| Third layer | C+A | C+E | C+A | C+E | C | C | A | E |
| Forth layer | C+A | C+E | C+A | C+E | C | C | C | C |
| Fifth layer | C | C | C+A | C+E | C | C | C | C |
| Total weight of a racket | 330 | 330 | 310 | 310 | 330 | 330 | 310 | 310 |
| Frame strength (Kg) | 145 | 150 | 122 | 125 | 108 | 110 | 87 | 85 |
| Vibration absorption | 42 | 38 | 25 | 22 | 49 | 45 | 36 | 31 |

A glass fiber prepreg G was prepared as generally described above, with the exception that only glass fiber strands ER 1150 (strand diameter=10500 denier, available from Nihon Ira Glass Co., Ltd.) were employed.

A carbon fiber prepreg C was also prepared as generally described above, with the exception that only carbon fiber strands as described.

A polyamide fiber prepreg A was prepared as desired above, with the exception that only the polyamide fiber strands were employed.

A polyester fiber prepreg E was prepared as described above, with the exception that only the polyester fiber strands were employed.

What is claimed is:

1. A composite prepreg for tennis rackets comprising a thermosetting resin and reinforcing fibers embedded therein, wherein said reinforcing fibers are a combination of (a) aromatic polyamide fibers and polyester fibers, or a mixture of aromatic polyamide fibers and polyester fibers and (b) carbon fibers, said fibers (a) are formed into a plurality of first yarn strands and said fibers (b) are formed into a plurality of second yarn strands. a ratio between a diameter of said second yarn strands and a diameter of said first yarn strands is in the range of 2 to ⅔, and said first yarn strands and said second yarn strands are arranged substantially in a plurality of sequential units of said first and second yarn strands therein.

2. The composite prepreg according to claim 1 wherein said thermosetting resin is an epoxy resin.

\* \* \* \* \*